United States Patent [19]

Dewey

[11] 4,349,929
[45] Sep. 21, 1982

[54] TWIST-LOCK CONNECTION AND TOOL UTILIZING SAME

[75] Inventor: George G. Dewey, Prospect Heights, Ill.

[73] Assignee: Illinois Tool Works Inc., Chicago, Ill.

[21] Appl. No.: 174,288

[22] Filed: Jul. 31, 1980

[51] Int. Cl.³ .............................................. B25F 1/10
[52] U.S. Cl. ........................................ 7/158; 81/439; 279/1 A; 408/226
[58] Field of Search ................ 408/226, 228, 229 R, 408/241 R; 279/1 A, 96, 97; 81/52.4, 429; 7/14.1, 1 G, 1 R, 158, 165

[56] References Cited

U.S. PATENT DOCUMENTS

| 151,450 | 5/1874 | Tolman. | |
|---|---|---|---|
| 1,182,934 | 5/1916 | Scott. | |
| 2,716,393 | 8/1955 | Fischer | 121/32 |
| 2,772,589 | 12/1956 | Brenholts | 81/52.4 |
| 3,135,522 | 6/1964 | Bell | 279/97 |
| 3,176,998 | 4/1965 | Parker | 279/76 |
| 3,336,611 | 8/1967 | Schepp | 7/158 |
| 3,965,510 | 6/1976 | Ernst | 7/158 |
| 3,984,192 | 10/1976 | Wanner et al. | 408/226 |
| 4,107,800 | 8/1978 | Jorgensen | 7/158 |
| 4,146,240 | 3/1979 | Neilsen | 279/19.5 |

FOREIGN PATENT DOCUMENTS

| 2346323 | 3/1974 | Fed. Rep. of Germany | 408/226 |
| 2414464 | 10/1975 | Fed. Rep. of Germany | 408/226 |

*Primary Examiner*—Leonidas Vlachos
*Attorney, Agent, or Firm*—Thomas W. Buckman

[57] ABSTRACT

Apparatus for attaching a drill bit to a power tool. A first adaptor can be chucked into the tool. A second adaptor has a shank with a first longitudinal groove extending from one end and a second lateral groove intersecting the first. The shank is received in a bore of the first adaptor and a protrusion engages in the first and then the second groove as the shank is inserted and then rotated. The bore has a resilient spring member which engages the shank of the second member and prevents undesired counter-rotation. The first adaptor is equipped with a hexagonal recess which can, alternatively, engage hex-headed fasteners or the hexagonal stem of an internal recess driver attachment.

7 Claims, 3 Drawing Figures

TWIST-LOCK CONNECTION AND TOOL UTILIZING SAME

The present disclosure relates to combination drilling and wrenching tools described and claimed in U.S. Pat. Nos. 3,965,510 and 4,107,800. While these tools perform their intended functions quite well, they are quite sophisticated and, accordingly, expensive to manufacture. The present invention provides a simpler tool with the additional capability of driving internal-recessed fasteners.

DETAILED DESCRIPTION OF THE INVENTION

Figure 1:
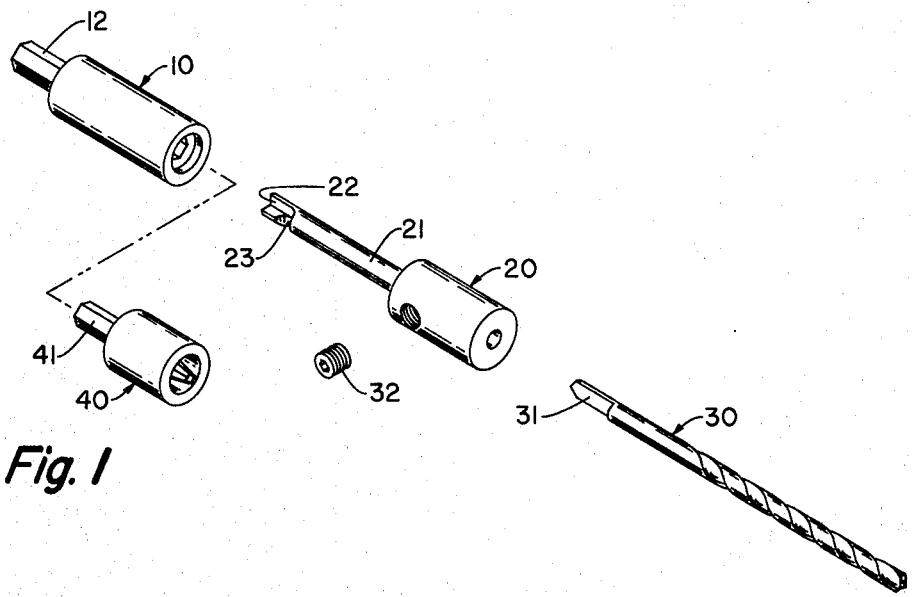
FIG. 1 is an exploded elevational view of a tool embodying the present invention.

The components of the tool of the present invention are shown in FIG. 1. The first member or adaptor 10 has a hexagonal stem 12 which is received in the chuck of a standard drill, a hammer drill, or a screwgun (not shown). First member 10 receives and secures a second member or adaptor 20 to the drill in a manner to be described hereafter. Adaptor 20, in turn, secures drill bit 30 by means of set screw 32. Alternatively, member 10 can receive drive member 40 for internal-recessed fasteners as will be described more fully herebelow.

Figure 2:
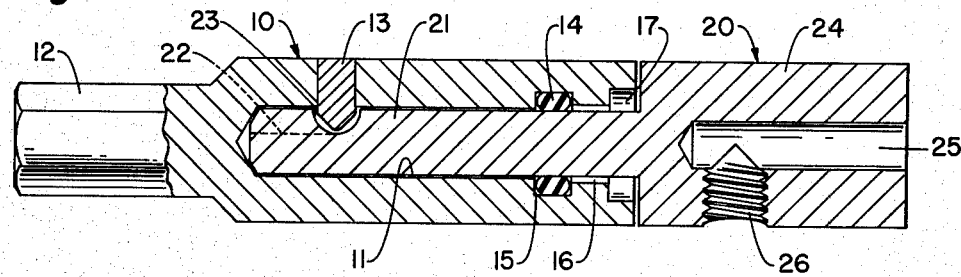
FIG. 2 is a side view in partial cross-section showing the first and second members in engagement.

As shown in more detail in FIG. 2, member 10 has a longitudinal bore 11 which extends at least partially therethrough. Projecting laterally into bore 11 is protrusion 13. While the protrusion could take the form of a removable set screw, it is preferred that the protrusion 13 take the form of a friction-fit plug or spot-welded member to insure proper depth of extension into bore 11. Resilient spring member 14 fits in enlarged bore portion 15 and is of such a size so as to reduce the dimensions of bore 11. This resilient spring member 14 may take the form of an elastomeric O-ring or a metal wire or strip member of any size or shape, so long as a portion of the resilient spring member projects into, and serves to reduce the dimensions of bore 11.

Second and third enlarged bore portions 16 and 17 are successively positioned adjacent portion 15. Enlarged bore portion 16 has a hexagonal configuration for engaging and driving hex-headed fasteners, while recess 17 has a diameter which exceeds the maximum diametral dimension of the fastener head and a height substantially equal to the height thereof. As has been described in U.S. Pat. No. 3,965,510, which description is hereby incorporated by reference, the presence of recess 17 prevents the over-torquing of the fastener which could otherwise result in fastener breakage or stripping of the threads. This is a result of the hex-head being withdrawn from recess 16 as the fastener becomes properly seated.

The second member or adaptor 20 has a longitudinally extending shank 21. Shank 21 has a first longitudinally extending slot 22 adjacent one end. A second slot 23 extends laterally of the first and intersects it at a point which is spaced from said one end. This second slot 23 received protrusion 13 to prevent longitudinal displacement between the first and second members. Both slot 23 and protrusion 13 may have any of a variety of possible shapes including those indicated in FIGS. 2 and 3. The body 24 of member 20 has a longitudinal bore 25. Laterally extending tapped recess 26 intersects the bore 25 near one end thereof.

The drill bit 30 may have a flat portion 31 which is engaged by set screw 32 to retain bit 30 in the member 20 from lateral and rotational displacement. Set screw 32 can be easily loosened by a conventional hex driver to permit removal and replacement of drill bit 30.

Drive member 40 has a hexagonal stem 41 of a size to be received in, and driven by, recess 16 of member 10. This drive member may be a conventional screwdriver bit or preferably is a driver attachment of the type described in U.S. application Ser. No. 141,863 filed Apr. 21, 1980. This driver 40 engages and drives internal-recessed fasteners of the cruciform slot type.

In use, adaptor 10 is chucked into a power tool. Shank 21 of member 20 is inserted into bore 11 with groove 22 in alignment with protrusion 13. Member 20 is then rotated clockwise (as viewed from the right side of FIG. 1) a small amount, on the order of ninety degrees or less depending on the configurations of the groove and protrusion, to bring the shoulder of groove 23 behind protrusion 13. Since resilient spring member 14 projects into bore 11, it will clampingly engage the periphery of the shank 21 and prevent undesired counter-rotation. Ordinarily, drill bit 30 will already be fixed in member 20. The workman then drills the pilot hole for the fastener. Since removal rotation is counter to the drilling rotational direction, the two members 10 and 20 will remain engaged.

A slight counterclockwise rotation as viewed from the right side of FIG. 1 permits axial withdrawal of shank 21 from bore 11. If a hex-headed fastener is being inserted in the pilot hole, recess 16 of member 10 engages it directly. If an internal-drive recessed fastener is to be driven, driver 40 is inserted into member 10. Hexagonal stem 12 mates with, and is driven by, hex recess 16. Resilient spring member 14 engages the periphery of stem 12 and retains it against undesired axial withdrawal.

Figure 3:
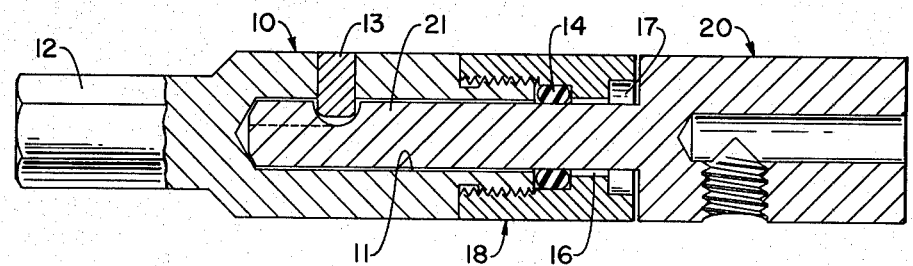
FIG. 3 is a partial cross-sectional side view of an alternate form of a portion of the present invention in which the first member has a removable nose piece.

An alternate configuration for member 10 is depicted in FIG. 3. In this embodiment, the forward end of the adaptor, which contains resilient spring member 14 and recesses 16 and 17, takes the form of a removable nosepiece 18 which is threadingly engaged on the remaining section. In this manner, nosepiece 18 can be removed and replaced to change the size of recesses 16 and 17 for fasteners with different head sizes.

The tool of present invention provides a fastener driving means which is only a few inches from the power tool. This is an advantage over the aforementioned prior art devices in which, in the fastener driving mode, the end of the nosepiece was almost a full foot from the power tool. Further, the simplicity of the present device reduces the expense of manufacture and skill necessary to operate the device.

Various changes, alterations and modifications will become apparent to a person of ordinary skill in the art following a reading of the foregoing specification. Accordingly, it is intended that all such changes, alterations and modifications as come within the scope of the appended claims be considered to be part of the present invention.

I claim:

1. Means for attaching a drill bit or the like to a power tool, said means comprising a first member having a longitudinal bore extending at least partially therethrough; protrusion means extending laterally into said bore at a first location, resilient spring means projecting into said bore at a second location spaced from the first location; a second member having a longitudinally extending shank which is received in the bore of said first member; said shank having a first groove extending longitudinally from a first end thereof and forming two generally radially extending walls disposed generally perpendicular to one another; a second groove extending laterally of, and intersecting one of said walls of said first groove at a point spaced from the first shank end; whereby the second groove creating a wall which is arcuate in configuration and having a portion inner most from the periphery of the shank generally located in the plane of the other of said two first groove walls, said first shank end may be inserted axially into said bore such that said protrusion means is received in said first groove, said second member rotated with respect to said first member to bring said protrusion means into engagement with said second groove to thereby prevent axial displacement between the first and second members and creating torque transmission mating bearing surfaces between the innermost wall portion of the second groove and the protrusion means, said resilient spring means frictionally engaging a portion of the surface of the shank to prevent undesired counter-rotation of the second member relative to said first member.

2. Attaching means according to claim 1 wherein said first member comprises an adaptor with a stem which is received in a power tool.

3. Attaching means according to claim 2 wherein the adaptor is provided with a hexagonally shaped recess having a greater diametral extent than said bore which recess is capable of engaging and driving hex-headed fasteners.

4. Attaching means according to claim 3 wherein the hexagonally shaped recess is formed in a removable portion of the adaptor.

5. The attaching means in accordance with claim 4 wherein the resilient spring means is also incorporated in a removable portion of the adaptor.

6. Attaching means according to claim 3 further comprising a drive means for an internal-drive-recessed fastener, said drive means including a hexagonal projection which is received in said hexagonally shaped recess of the adaptor and driven thereby, said projection being engaged by said resilient spring means and retained against undersired axial displacement.

7. Attaching means according to claim 1 wherein the second member is itself an adaptor which receives a portion of a drill bit in a longitudinal bore, said adaptor having means which extends at least partially into the bore to secure said drill bit against axial and rotational displacement.

* * * * *